July 17, 1923.
G. JORDAHN
1,461,911
PNEUMATIC SUPPORT
Filed Aug. 19, 1922
2 Sheets-Sheet 1
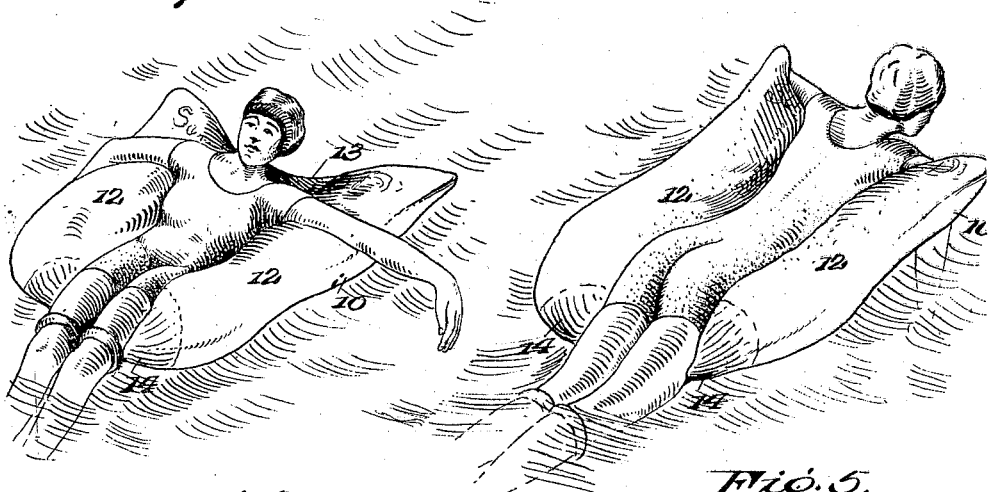
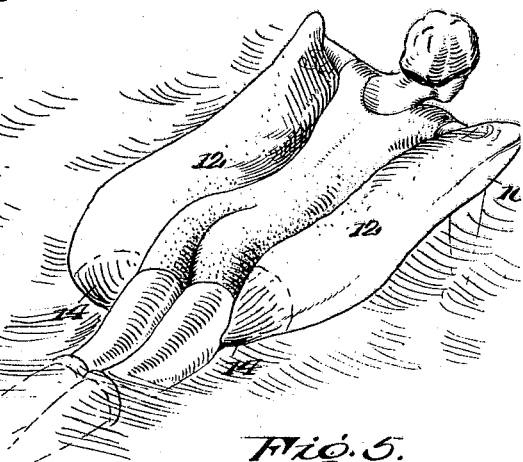
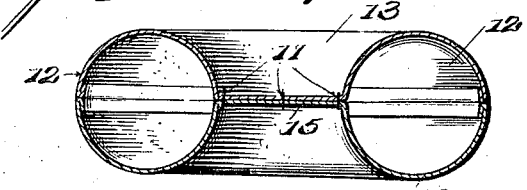
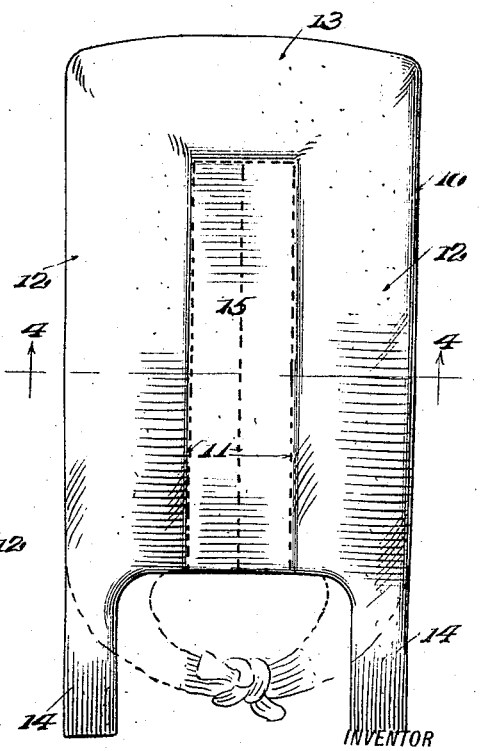
WITNESSES
INVENTOR
Gus Jordahn.
BY
ATTORNEYS July 17, 1923.
G. JORDAHN
1,461,911
PNEUMATIC SUPPORT
Filed Aug. 19, 1922
2 Sheets-Sheet 2
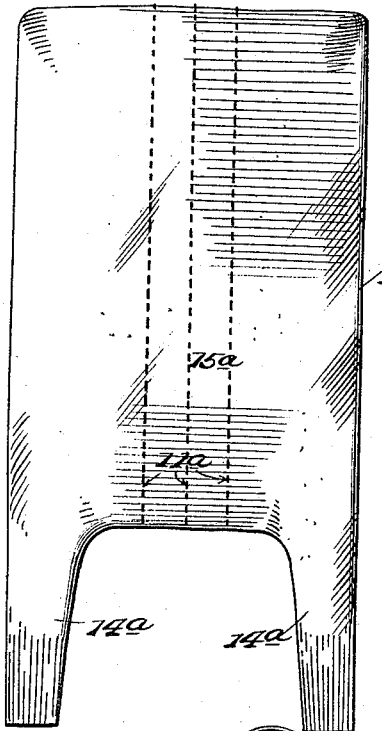
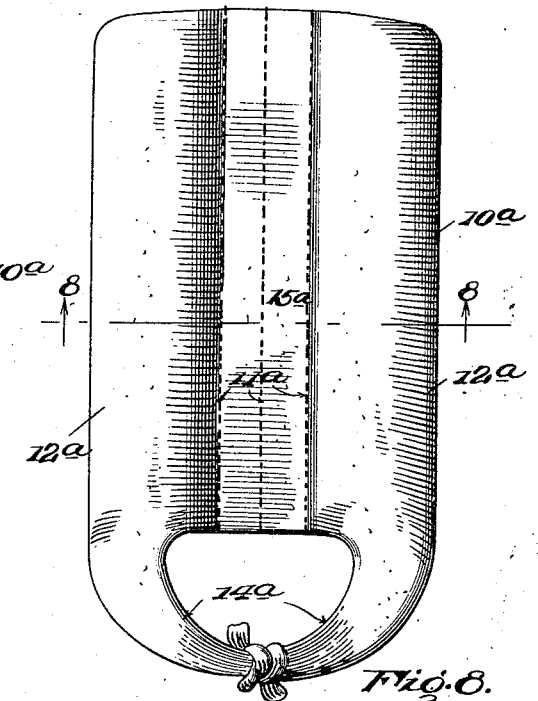
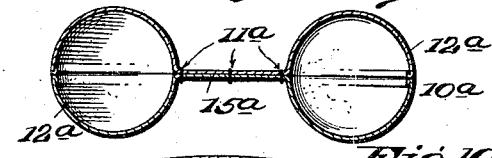
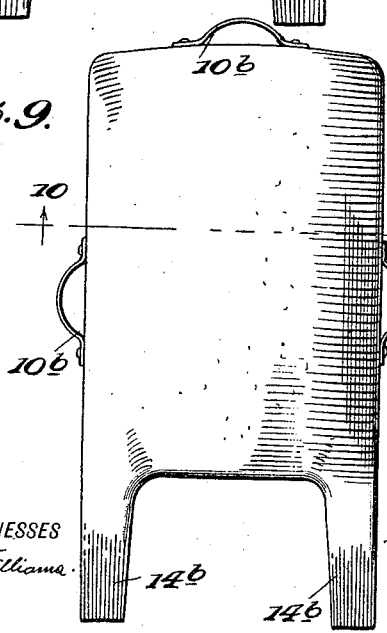
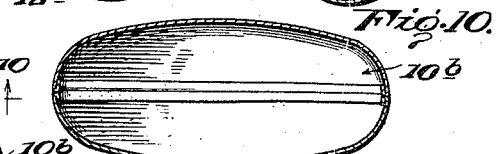
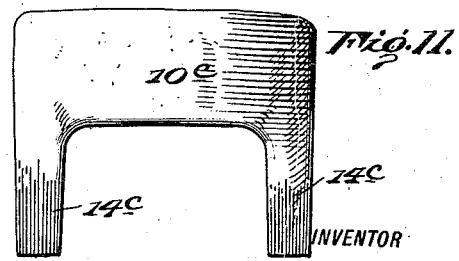
WITNESSES
V.A.Williams
INVENTOR
Gus Jordahn.
BY
ATTORNEYS Patented July 17, 1923.

1,461,911

UNITED STATES PATENT OFFICE.

GUS JORDAHN, OF PALM BEACH, FLORIDA.

PNEUMATIC SUPPORT.

Application filed August 19, 1922. Serial No. 582,914.

*To all whom it may concern:*

Be it known that I, GUS JORDAHN, a citizen of the United States, and a resident of Palm Beach, in the county of Palm Beach and State of Florida, have invented certain new and useful Improvements in Pneumatic Supports, of which the following is a specification.

My present invention relates to certain improvements in pneumatic supports, and while especially adapted as a support for use in the water may be readily applied for other uses as for instance pneumatic cushions for vehicles and pneumatic mattresses for beds.

More particularly my invention relates to certain improvements developed in connection with, and during practical use of my somewhat similar device for teaching the art of swimming as described and claimed in my Patent 1,368,937 dated February 15, 1921, my object being to extend the use of such apparatus to surf boards and floats employed in the water and at the same time retain the advantages thereof in respect to assistance in learning to swim.

My present invention proposes an apparatus shown in the accompanying drawings, which form a part of this specification and in which, Figures 1, 2 and 3 are perspective views illustrating practical use of the apparatus as a float or surf board as well as a device for assisting in learning to swim, Figure 4 is a cross section taken on line 4—4 of Figure 5, Figure 5 is a top plan view of the apparatus, practical use of which is shown in Figures 1, 2 and 3, Figures 6 and 7 are top plan views illustrating a slight modification and respectively showing the modified device before and after inflation, Figure 8 is a cross section taken on line 8—8 of Figure 7, Figure 9 is a plan view of another slightly modified construction before inflation, Figure 10 is a cross section through the form of Figure 9, and Figure 11 is a plan view of still another modified form.

Referring now to these figures and particularly to Figures 1, 2 and 3 my invention proposes an apparatus capable of use as a float as indicated particularly in Figure 1 or as a surf board as indicated in Figure 2, as well as a device by which the body of a person may be sustained in a convenient position for learning to swim as shown in Figure 2 and also as indicated in Figure 3 from the latter of which figure it will be noted that I retain the body encircling feature of my previous patent, for employment where desired.

The apparatus shown in these figures and particularly illustrated in Figures 4 and 5 consists of an enlarged and generally rectangular body 10, which is hollow and for this purpose is formed of double layers of any suitable material such as rubber, rubberized cloth, or finely woven cotton cloth adapted when wet to retain air. The upper and lower layers of this body are preferably stitched by longitudinal rows of stitching 11, so as to connect the layers and thus divide the body into longitudinal side inflatable portions 12 so that the body of the user may lie between these portions and thus find a convenient support against ready side slipping. These rows of stitching, extending from one end of the body preferably terminate short of the opposite end thereof to provide an inflatable portion 13 at one end communicating between the adjacent ends of the side inflatable portions 12.

At its opposite end the body 10 has spaced longitudinally extending and substantially parallel tubular extensions 14, each of which is relatively small as compared to the body 10, and each of which provides for the ready inflation of the body or its inflatable portions, by simply blowing the breath into one or both of the extensions while holding the mouth a certain distance from the open free end of the extension. I have found that inflation may be much more readily, quickly and effectively accomplished in this way than by holding the end of the extension close to the mouth in a manner which is sufficiently effective in connection with a small body encircling tube such as proposed in my previous patent.

The extensions 14 are of sufficient length so that their free ends may be drawn across one another and effectively tied as particularly seen in dotted lines in Figure 5, so that this tying of the extensions serves a double purpose, in fact a threefold purpose, because it retains air within the body and the remaining portions of the extensions, adapts these extensions to augment the body in length and thus the complete area of the supporting surface, and also provides for the encircling of the body as indicated in Figure 3 whereby the apparatus as a whole may be attached to the person using the same.

Those portions of the upper and lower layers of the body connected by the rows of stitching 11 to form a generally flat supporting surface 15 between the side inflatable portions 11 may if desired be extended for the full length of the body as indicated at 15ª in Figures 6, 7 and 8 where the body 10ª thus has side inflatable portions 12ª extending for the full length thereof and independently inflated in the manner before described through the tubular extensions 14ª the latter of which are otherwise utilized in the manner as previously described.

Moreover it is possible that the stitches 11 of Figures 4 and 5 and 11ª of Figures 6, 7 and 8 may be omitted entirely and the body of the support left with a completely open interior as seen at 10ᵇ in Figures 9 and 10, having tubular extensions 14ᵇ of the same formation and adapted for the same uses as previously described. This form of construction may be used as a float even though not so well adapted for this purpose as the devices of Figures 4 to 8 inclusive, and is particularly useful as a mattress or for instance a life preserver.

In Figure 11 I have shown still another modified form in which the body 10ᶜ is of somewhat smaller dimensions than usual so as to adapt the same for use as a seat cushion and the like, and provided with tubular extensions 14ᶜ adapted to be used and manipulated as previously described.

It is obvious from the foregoing that my present improvements are capable of a wide range of use, may be readily and quickly inflated without the use of inflating devices, and the means for ready inflation of which are such as not only to retain air within the body, but will when tied augment the supporting surface.

I claim:

1. A pneumatic support having a generally rectangular inflatable body provided with relatively small spaced apart tubular extensions into which air may be blown for inflating the body, said extensions having open free ends and being of a length adapting the same to effective tying and to serve the double purpose when tied of retaining air within the body and augmenting the supporting surface of the body.

2. A pneumatic support including an inflatable body portion and a pair of inflatable tubular extensions extending in spaced relation from and in communication with the body portion, said extensions having open free ends forming means whereby air may be blown into the body portion and being also adapted to be tied together for retaining air within the body portion and to encircle the body of the user as well as augment the supporting surface of the inflatable body.

3. A pneumatic support having a generally rectangular inflatable body portion and a pair of tubular extensions having open free ends, projecting from the body portion in spaced apart substantially parallel relation, said extensions being adapted to be tied together at their free ends whereby to retain air within the body and augment the supporting surface thereof.

GUS JORDAHN.